United States Patent [19]

Yamada et al.

[11] Patent Number: 5,055,352

[45] Date of Patent: Oct. 8, 1991

[54] FERROMAGNETIC THIN FILM MAGNETIC RECORDING MEDIUM HAVING AN INTERMEDIATE LAYER CONTAINING ULTRAFINE PARTICLES AND A POLAR GROUP CONTAINING BINDER RESIN HAVING A LOSS TANGENT PEAK TEMPERATURE IN A SPECIFIED RANGE

[75] Inventors: Yasuyuki Yamada; Hiroshi Hashimoto, both of Kanagawa, Japan

[73] Assignee: Fuji Photo Film Co., Ltd., Kanagawa, Japan

[21] Appl. No.: 522,021

[22] Filed: May 11, 1990

[30] Foreign Application Priority Data

May 12, 1989 [JP] Japan .................................. 1-119858
Jul. 4, 1989 [JP] Japan .................................. 1-172414

[51] Int. Cl.$^5$ ............................................. G11B 23/00
[52] U.S. Cl. .................................. 428/336; 428/694; 428/900; 428/338; 428/402
[58] Field of Search ............... 428/900, 694, 334, 338, 428/402, 336

[56] References Cited

U.S. PATENT DOCUMENTS

| | | | |
|---|---|---|---|
| 3,215,554 | 11/1965 | Loots | 117/76 |
| 4,619,856 | 10/1986 | Kamada et al. | 428/143 |
| 4,741,977 | 5/1988 | Koga et al. | 428/694 |
| 4,786,557 | 11/1988 | Kakuishi et al. | 428/418 |

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A ferromagnetic thin film type magnetic recording medium is disclosed, comprising a nonmagnetic intermediate layer formed between a nonmagnetic support and a magnetic layer, the intermediate layer containing a binder resin and ultrafine particles, wherein the ultrafine particles have a diameter of from 5 to 250 nm and (a) the binder resin has as a polar group at least one group selected from the group consisting of $-SO_3M$, $-OH$, $-OSO_3M$, $-COOM$,

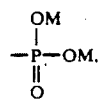

$-NR_2$ and $-\oplus NR_3X\ominus$ wherein M is H, Li, Na, K or a hydrocarbon group, R is H, or an alkyl group, and X is a halogen atom, or (b) the peak temperature of the loss tangent ($\tan\delta$) of the binder resin is from 10 to 90° C.

The magnetic recording medium has an excellent running durability, still life and frictional property.

12 Claims, 1 Drawing Sheet

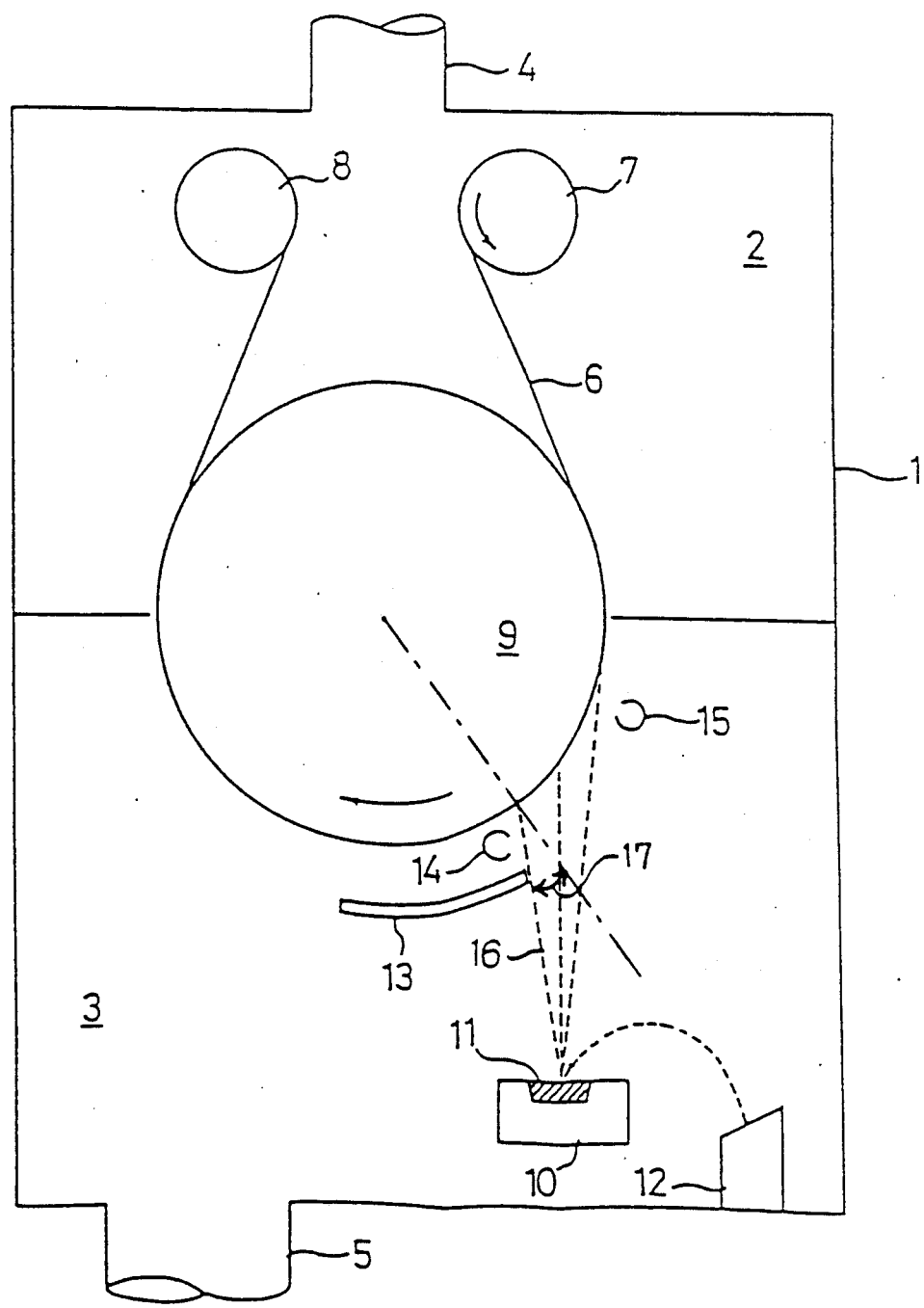

5,055,352

FERROMAGNETIC THIN FILM MAGNETIC RECORDING MEDIUM HAVING AN INTERMEDIATE LAYER CONTAINING ULTRAFINE PARTICLES AND A POLAR GROUP CONTAINING BINDER RESIN HAVING A LOSS TANGENT PEAK TEMPERATURE IN A SPECIFIED RANGE

FIELD OF THE INVENTION

The present invention relates to a magnetic recording medium, and more particularly it relates to a ferromagnetic thin film type magnetic recording medium for higher density recording, which has an excellent running durability, still durability (still life), and frictional property.

BACKGROUND OF THE INVENTION

In order to increase the recording density of a high density magnetic recording medium, there has been used a nonmagnetic support film having a very smooth surface. When the surface of the nonmagnetic support film is smooth, the frictional resistance thereof against a conveying roller becomes large, thereby frequently causing winding or wrinkles. Further, the frictional resistance between the nonmagnetic support films are increased so that a winding roll is liable to be warped.

Recently, using a deposition or sputtering, etc., there has been developed a magnetic recording medium comprising a ferromagnetic thin film made of Co-Ni, Co-Cr, or Fe-N, etc. However, since the ferromagnetic thin film is much more smooth and thin than a magnetic layer formed by coating which comprises mainly ferromagnetic particles and a binder resin, the above-mentioned problems are further increasing.

In order to solve such problems, various attempts have been made, one of which is to provide an intermediate layer of a coating type between a magnetic layer and a support. Depending on the situation, such intermediate layer can be called an under coat.

For example, in JP-A-56—116115.(the term "JP-A" as used herein means an "unexamined published Japanese patent application"), JP-A-53—128683, JP-A-54—94574, JP-A-56—10455, and JP-A-56—16937, the surface of a nonmagnetic support is finely and uniformly roughened so that it can well touch a magnetic head and the running property can be improved.

JP-A-58—68227 discloses a method in which a ferromagnetic thin film is formed on a plastic film, the surface of which has a granular film to which fine particles having a size of 0.01 to 0.2 μm or is formed with wormlike nodules are added.

JP-A-59-48825 proposes that colloidal silica and binders are used to form an undercoating layer, thereby forming 1000 pieces/mm² or more of granular protrusions of 30 to 500 Å high.

However, in these prior arts, it is difficult to form on a support an undercoating layer in which fine particles are uniformly dispersed in binders. Namely, there is formed on a support an undercoating layer in which fine particles are not uniformly dispersed but aggregate therein.

As a result, there are problems that clearance loss between a magnetic head and a magnetic layer is increased, thus lowering the output; still life is made to be shortened; and running durability is made to be lowered.

SUMMARY OF THE INVENTION

An object of the present invention is to provide a ferromagnetic thin film type magnetic recording medium for higher density recording comprising a nonmagnetic intermediate layer in which ultrafine particles are uniformly dispersed, and the running property as well as durability are excellent.

According to the present invention, there is provided a ferromagnetic thin film type magnetic recording medium comprising a nonmagnetic intermediate layer formed between a nonmagnetic support and a magnetic layer, the intermediate layer containing a binder resin and ultrafine particles, wherein the ultrafine particles have a diameter of from 5 to 250 nm and (a) the binder resin has as a polar group at least one group selected from the group consisting of $-SO_3M$, $-OH$, $-OSO_3M$, $-COOM$,

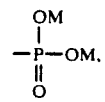

$-NR_2$ and $-\oplus NR_3X\ominus$ wherein M is H, Li, Na, K or a hydrocarbon group, R is H, or an alkyl group, and X is a halogen atom, or (b) the peak temperature of the loss tangent (tanδ) of the binder resin is from 10 to 90° C., preferably from 15 to 85° C., particularly preferably from 18 to 80° C.

BRIEF DESCRIPTION OF THE DRAWING

The present invention can be more fully understood from the following detailed description when taken in conjunction with the accompanying drawing.

The drawing shows a view showing a winding type vacuum vapor deposition device used for forming a magnetic recording medium of the present invention, in which each numeral indicates as follows:
1: vacuum chamber;
2: upper room;
3: vapor deposition room;
4, 5: vacuum exhaust opening;
6: non-magnetic support;
7: supply roll;
8: winding roll;
9: cold can (rotating drum);
10: evaporation boat;
11: magnetic material;
12: electrogun;
13: mask;
14, 15: gas inlet;
16: vapor flow; and
17: incident angle.

DETAILED DESCRIPTION OF THE INVENTION

In the magnetic recording medium of the present invention, wherein the nonmagnetic intermediate layer contains a binder resin having at least one polar group selected from the group consisting of $-SO_3M$, $-OH$, $-OSO_3M$, $-COOM$, $-PO(OM)_2$, $-NR_2$ and $-\oplus NR_3X\ominus$ (wherein M is H, Li, Na, K, or a hydrocarbon group having preferably 1 to 10 carbon atoms, R is H, or an alkyl group having preferably 1 to 6 carbon atoms, and X is a halogen atom), ultrafine particles having a diameter of 5 to 250 nm are evenly dispersed, the height of convex portions formed on the surface of the nonmagnetic intermediate layer is made relatively flat, therefore, the magnetic recording medium uniformly touches a magnetic head, and still life comes to increase. Further, there are formed on the surface of the nonmagnetic intermediate layer minute convex and concave portions the size and distribution of which are uniform, with the result that the contact surface between the magnetic recording medium and a magnetic head is decreased, and nevertheless the friction coefficient becomes small. In addition, the skip of the magnetic head due to big particles can be prevented, therefore, clearance loss is made small, and the decrease in output is lowered.

In the ferromagnetic thin film type magnetic recording medium of the present invention, when a binder resin in which the peak temperature of the loss tangent (tan$\delta$) thereof is 10 to 90° C. is used, there can be formed a magnetic layer having a comparatively smooth surface.

As a result, the following excellent effects:

(1) the magnetic recording medium smoothly comes in contact with a magnetic head so that the still life is increased;

(2) the magnetic recording medium closely touches a magnetic head, therefore, clearance loss becomes small and the output is increased; and (3) the running durability is increased.

The peak temperature of the loss tangent (tan$\delta$) of the binder resin of the present invention is represented by the viscoelastic properties of the binder resin film, which are measured under a frequency of 110 Hz at a heat-up temperature of 2 degrees/minute. The measurement of the peak temperature of the loss tangent is disclosed in *Mechanical Properties of Polymers*, Chapter 7, written by Lawrence E. Nielsen and published by Reinhold Publishing Corp., New York (1962).

In the present invention, the ultrafine particles for forming the nonmagnetic intermediate layer can be composed of various inorganic particles or organic particles. Among them, inorganic particles such as $TiO_2$, $Fe_2O_3$, $CaCO_3$, $BaSO_4$, $SiO_2$, $Al_2O_3$, SiC and $Cr_2O_3$ are preferably used.

Inorganic particles having a Mohs' hardness of 6 or higher such as $SiO_2$, $Al_2O_3$, SiC and $Cr_2O_3$ are particularly preferred in terms of running durability.

Most preferred is $SiO_2$, particularly the so-called silica sol in which amorphous silicic anhydride fine particles are dispersed in an organic solvent.

The ultrafine particles have a diameter of 5 to 250 nm, preferably 10 to 80 nm. When the size of the particles is too small, still life and running property are not significantly improved, whereas when their size is too large, clearance loss between a magnetic head and the magnetic recording medium is increased, thus leading to an insufficient output.

The diameter of the ultrafine particles refers to the maximum length of the particles.

The binder resin for forming the nonmagnetic intermediate layer of the present invention, which contains as a polar group at least one selected from the group consisting of $-SO_3M$, $-OH$, $-OSO_3M$, $-COOM$,

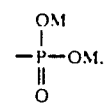

$-NR_2$ and $-\oplus NR_3X\ominus$ (wherein M is H, Li, Na, K or a hydrocarbon group, R is H or an alkyl group, and X is a halogen atom), includes resins having film-forming properties (e.g., cellulose resins such as nitro cellulose, thermoplastic resins and thermosetting resins such as acrylic resin and epoxy resin) and is preferably polyurethane, polyester or vinyl acetate resin, each having a number average molecular weight of about 10,000 to 100,000, preferably about 30,000 to 80,000.

When the molecular weight is too small, the contact between the intermediate layer and the nonmagnetic support becomes poor, whereas when it is too large, it is difficult for the ultrafine particles to be uniformly dispersed. The concentration of the polar group is preferably $1\times 10^{-2}$ eq/g to $1\times 10^{-7}$ eq/g, more preferably $1\times 10^{-3}$ eq/g to $7\times 10^{-5}$ eq/g. When the concentration of the polar group is too high, the solubility of the binder resin in an organic solvent is decreased, whereas when it is too low, it is difficult for ultrafine particles to be uniformly dispersed.

Examples of the binder resin in which the peak temperature of the loss tangent (tan$\delta$) is 10 to 90° C. include Stafix (polyester resin produced by Fuji Photo Film Co., Ltd.), Vylon #200 (polyester resin produced by Toyobo Co., Ltd.), Vylonal #1400 (polyester resin produced by Toyobo Co., Ltd.), 400×110 A (polyvinyl chloride resin produced by Nippon Zeon Co., Ltd.), UR-8200 (polyurethane resin produced by Toyobo Co., Ltd.), and N-2301 (polyurethane resin produced by Nippon Polyurethane Co., Ltd.). Among such binder resins, those which have as a polar group at least one group selected from the group consisting of $-SO_3M$, $-OH$, $-OSO_3M$, $-COOM$, $-PO(OM)_2$, $-NR_2$ and $-\oplus NR_3X\ominus$, (wherein M is H, Li, Na, K or a hydrocarbon group, R is H or an alkyl group, and X is a halogen atom) can be preferably used in the present invention.

In the present invention, the peak temperature of the loss tangent (tan$\delta$) of the binder resin is measured as follows. Namely, the binder resin is formed into a film of 25 $\mu$m thick, and the viscoelastic properties of the film are measured under a frequency of 110 Hz at a heat-up temperature of 2 degrees/minute using a viscoelastic measuring device.

When the peak temperature of the loss tangent (tan$\delta$) is less than 10° C., the surface of the intermediate layer, and thus the magnetic layer, is made uneven by heat when the magnetic layer is formed by evaporation or sputtering.

When the peak temperature of the loss tangent (tan$\delta$) is more than 90° C., the adhesion ability between the nonmagnetic intermediate layer and the nonmagnetic support is lowered, so that the magnetic layer is liable to be broken at the edge of the magnetic recording medium while it is running for a long period of time.

It is preferred that the binder resin has a number average molecular weight of 10,000 to 100,000, preferably 30,000 to 80,000.

The ultrafine particles are preferably contained in the nonmagnetic intermediate layer at a rate of 1 to 100 particles/$\mu m^2$, more preferably 3 to 70 particles/$\mu m^2$, most preferably 4 to 30 particles/μm². When the rate is less than the lowermost value, μ value is increased and still life is lowered. When the rate is more than the uppermost value, noise is increased.

In the nonmagnetic intermediate layer of the present invention, the mixing ratio of the ultrafine particles to the binder resin is from ⅓ to 1/80 by weight, preferably 1/5 to 1/60 by weight.

The ultrafine particles are dispersed in the binder resin to prepare a coating composition. The coating composition thus obtained is coated on the nonmagnetic support, and then dried to form the nonmagnetic intermediate layer.

The thickness of the nonmagnetic intermediate layer is preferably in the range of from 1 to 100 nm, more preferably 3 to 50 nm. If the thickness is out of the range, the object of the present invention cannot be obtained.

In order to prepare the coating composition used to form the nonmagnetic intermediate layer of the present invention, organic solvents can be adopted on arbitrary basis.

Examples of such organic solvents include ketones such as acetone, methyl ethyl ketone, methyl isobutyl ketone, cyclohexanone, and isophorone; alcohols such as methanol, ethanol, propanol, butanol, isobutyl alcohol, isopropyl alcohol, and methyl cyclohexanol; esters such as methyl acetate, ethyl acetate, butyl acetate, isobutyl acetate, isopropyl acetate, ethyl lactate, and glycol lactate monoethyl ether; ethers such as diethyl ether, tetrahydrofuran, glycol dimethyl ether, glycol monoethyl ether, and dioxane; aromatic hydrocarbons such as benzene, toluene, xylene, cresol, chlorobenzene, and styrene; chlorinated hydrocarbons such as methylene chloride, ethylene chloride, carbon tetrachloride, chloroform, ethylene chlorohydrin, and dichlorobenzene; N,N-dimethyl formaldehyde; and hexane.

The nonmagnetic support used in the present invention can be made of materials such as polyesters (e.g., polyethylene terephthalate, polyethylene-2,6-naphthalate), polyolefins (e.g., polyethylene, polypropylene), cellulose derivatives (e.g., cellulose triacetate), polycarbonate, polyimide, polyamide-imide, aluminum or an alloy thereof, copper, glass, or ceramics.

The ultrafine particles and the binder resin are well mixed and kneaded together using a roll mill, a sand grinder mill, a ball mill, a high speed mixer, etc., to prepare the coating composition. The coating composition thus prepared can be coated on the nonmagnetic support using a bar coater, a coil bar coater, a micro gravure coater, a doctor blade coater, a reverse roll coater, a curtain coater, an extrusion coater, etc., and then dried, thereby forming the nonmagnetic intermediate layer. The temperature and air volume for drying can be optionally selected.

A magnetic layer comprising a ferromagnetic thin film is provided on the nonmagnetic intermediate layer using a vacuum metallizing method such as a vacuum evaporation method, a sputtering method, an ion plating method, or a chemical vapor plating method. The vacuum metallizing method is advantageous because a metal thin film can be formed rapidly, the manufacturing steps are simple, the anticorrosion is improved, and it is not necessary to treat waste liquors.

The above mentioned ferromagnetic thin film can be made of materials such as iron, cobalt, nickel, ferromagnetic alloys (i.e., Fe-Co, Fe-Ni, Fe-N, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re, Co-Sm-Cu), Fe-N, or Fe-N-0. These materials are formed into a film in a vacuum chamber, or using a plating method.

The thickness of the ferromagnetic thin film can be 0.05 to 2 μm, preferably 0.1 to 0.4 μm.

In the present invention, when lubricating agents or rust preventives are coated on the magnetic recording medium, the running properties can be further increased. The lubricating agents or rust preventives may be added to a backing layer. Examples of the lubricating agents include fatty acids, alkylsulfonic acids and metal salts thereof (e.g., stearic acid, oleic acid, lauric acid, octadecanoic acid sodium salt). Examples of the rust preventives include 2-amino benzimidazole and 5-nitro benzimidazole.

According to the present invention, a magnetic recording medium having a ferromagnetic thin film as a magnetic layer and having great output as well as excellent running durability can be obtained by the use of a nonmagnetic intermediate layer comprising a binder resin having a polar group or a binder resin having the peak temperature of the loss tangent (tanδ) of 10 to 90° C., and ultrafine particles having a diameter of 5 to 250 nm.

The present invention is described in greater detail with reference to the following examples, although it is not limited thereto.

EXAMPLE 1

A coating composition comprising components A, B and C, which are shown below, was coated on a nonmagnetic support of a polyethylene terephthalate film which was 10 μm thick and 100 mm wide, and thereafter was forcibly dried with heated air of 100° C. to obtain a nonmagnetic intermediate layer having a dry thickness of 8 nm.

Component A

A solution having a solid content of 10% consisting of polyester resin (neopentyl glycol-isophthalic acids) having a molecular weight of 45,000 as a binder resin and $-SO_3Na$ of $3.5 \times 10^{-3}$ eq/g as a polar group and cyclohexanone/MEK (weight ratio : 6/4)
12 parts by weight

Component B

A solution having a solid content of 5% consisting of silica colloid sol ($SiO_2$ particle size:20 nm) as ultrafine particles and cyclohexanone/MEK (weight ratio:6/4)
2 parts by weight

Component C

Cyclohexanone/MEK (weight ratio:6/4)
786 parts by weight

A magnetic thin film of Co-Ni (Ni:20 atom%) was formed on the above nonmagnetic intermediate layer by an oblique incident evaporation method using a winding type vacuum vapor deposition device shown in the drawing, thereby preparing an original magnetic tape web. The incident angle 17 of a vapor flow being regulated by mask 13 was 35 degrees. The angle means the angle formed by a normal put up on cooling can 9 and a vapor flow 16 of Co-Ni. The vapor deposition was carried out while oxygen gas was introduced from gas inlets 14 and 15.

The carrying speed of nonmagnetic support 6 was 20 m/min. and the thickness of the magnetic layer was made to be 2000 A. A perfluoropolyether-based lubricating agent was coated on the magnetic layer so that the thickness thereof could be 80 A.

The tape web which was wound by the winding roll 8 was slit to a 8 mm width, thereby obtaining sample No. 1 corresponding to a ferromagnetic thin film type magnetic recording medium for a 8 mm video tape.

In addition, the polyester resin used for forming the binder resin was dissolved in a solvent of methyl ethyl ketone/toluene (weight ratio:9/1) to prepare a 20% solution of the resin. The solution thus prepared was treated using a casting method to obtain a resin film having a dry thickness of 25 μm.

The dynamic modulus of such binder resin film was measured at a heat-up temperature of 2 degrees/minute under a vibrating frequency of 110 Hz using a dynamic viscoelastic measuring device, and the peak temperature of the loss tangent (tanδ) of the binder resin was found to be 65° C.

EXAMPLE 2

The same procedure as in Example 1 was repeated to prepare Sample No. 2 of a ferromagnetic thin film type magnetic recording medium except that the polyester resin in component A was replaced with polyvinyl chloride resin having a molecular weight of 24,000 and a $-SO_3Na$ content of $5.5 \times 10^{-4}$ eq/g.

EXAMPLE 3

The same procedure as in Example 1 was repeated to prepare Sample No. 3 of a ferromagnetic thin film type magnetic recording medium except that the polyester resin in component A was replaced with polyurethane resin having a molecular weight of 25,000 and a $-COOH$ content of $3.6 \times 10^{-5}$ eq/g.

COMPARATIVE EXAMPLE 1

The same procedure as in Example 1 was repeated to prepare Sample No. C-1 of a ferromagnetic thin film type magnetic recording medium except that the polyester resin in component A was replaced with a vinyl chloride/vinyl acetate copolymer (78/22 weight ratio; polymerization degree: 420) having no polar groups.

COMPARATIVE EXAMPLE 2

The same procedure as in Example 1 was repeated to prepare Sample No. C-2 of a ferromagnetic thin film type magnetic recording medium except that the polyester resin in component A was replaced with polyester resin (molecular weight: 45,000) having no polar groups.

EXAMPLE 4

The same procedure as in Example 1 was repeated to prepare Sample Nos. 4 to 10 of a ferromagnetic thin film type magnetic recording medium except that the silica colloid sol in component B was replaced with the following ultrafine particles each having a diameter of not larger than 60 nm.

| Sample No. 4 | $Al_2O_3$ |
| Sample No. 5 | SiC |
| Sample No. 6 | $Cr_2O_3$ |
| Sample No. 7 | $TiO_2$ |
| Sample No. 8 | $Fe_2O_3$ |
| Sample No. 9 | $CaCO_3$ |
| Sample No. 10 | $BaSO_4$ |

EXAMPLE 5

The same procedure as in Example 1 was repeated to prepare Sample Nos. 11 to 16 of a ferromagnetic thin film type magnetic recording medium except that the concentration of $-SO_3Na$ in component A was replaced with the following:

| Sample No. | Concentration of $SO_3Na$ |
| --- | --- |
| No. 11 | $1 \times 10^{-1}$ eq/g |
| No. 12 | $1 \times 10^{-3}$ eq/g |
| No. 13 | $1 \times 10^{-4}$ eq/g |
| No. 14 | $1 \times 10^{-6}$ eq/g |
| No. 15 | $1 \times 10^{-7}$ eq/g |
| No. 16 | $1 \times 10^{-8}$ eq/g |

The polyester resin used in Sample No. 11 was insufficient to be solved in the solvent (cyclohexanone/MEK). The dispersibility of the silica colloid sol in component B was not good so that an aggregate was formed. In the polyester resin used in Sample No. 16, the dispersion of the silica colloid sol in component B was insufficient, thus forming an aggregate.

EXAMPLE 6

The same procedure as in Example 1 was repeated to prepare Samples Nos. 17 to 22 of a ferromagnetic thin film type magnetic recording medium except that the disposition density of ultrafine particles in component B was replaced with the following:

| Sample No. | Disposition density of ultrafine particles |
| --- | --- |
| No. 17 | 0 particles/$\mu m^2$ (No component is added) |
| No. 18 | 1 particle/$\mu m^2$ |
| No. 19 | 5 particles/$\mu m^2$ |
| No. 20 | 10 particles/$\mu m^2$ |
| No. 21 | 15 particles/$\mu m^2$ |
| No. 22 | 30 particles/$\mu m^2$ |

Regarding Sample Nos. 1 to 22, and Sample Nos. C-1 to C-2 thus obtained, their still lives, outputs at 7 MHz, drops in output for 120 minutes for 100 passes, and uniform dispersibilities of ultrafine particles in nonmagnetic intermediate layers were measured in the following manner. Table 1 shows the results.

All the measuring devices used were remodeled ones of "Fujix M-6" produced by Fuji Photo Film Co., Ltd.

(1) Still life

It was measured at 23° C. and 20% RH in a state in which 20 g in weight was applied to the tape. The time (minutes) for which the first output is decreased to 3 dB was measured.

(2) Output at 7 MHz

It was shown in terms of a relative value with respect to Sample No. 1 which was assigned to a standard (0 dB) when recording was done at 7 MHz. The measurement was conducted at 23° C. and 50% RH.

(3) Drop in output for 120 minutes for 100 passes

The decreased amount of RF output from the initial value was measured when color bar signals were recorded. The measurement was conducted at 23° C. and 50% RH.

(4) Uniform dispersibility

It was evaluated using an FE-SEM of 50,000 magnifications.

TABLE 1

| Sample No. | Uniform dispersibility | Still life | Output at 7 MHZ (dB) | Drop in output for 120 min. for 100 passes |
|---|---|---|---|---|
| 1 | good | >60 minutes | 0 (Standard) | −0.3 dB |
| 2 | good | >60 minutes | −0.1 | −0.2 dB |
| 3 | good | >100 minutes | −0.1 | −0.2 dB |
| C-1 | much aggregation | 5 minutes | −3.2 | −2.8 dB |
| C-2 | much aggregation | 13 minutes | −2.5 | −3.0 dB |
| 4 | good | >60 minutes | −0.1 | −0.2 dB |
| 5 | good | >60 minutes | −0.1 | −0.1 dB |
| 6 | good | >60 minutes | 0 | −0.2 dB |
| 7 | 3% aggregation | >60 minutes | −0.1 | −0.3 dB |
| 8 | 4% aggregation | >60 minutes | −0.2 | −0.3 dB |
| 9 | 4% aggregation | >60 minutes | −0.2 | −0.2 dB |
| 10 | 7% aggregation | >60 minutes | −0.3 | −0.3 dB |
| 11 | not evenly dispersed | <1 minute | −3.8 | −3.1 dB |
| 12 | good | >60 minutes | 0 | −0.2 dB |
| 13 | good | >60 minutes | 0 | −0.2 dB |
| 14 | good | >60 minutes | +0.1 | −0.1 dB |
| 15 | good | >60 minutes | +0.1 | −0.1 dB |
| 16 | much aggregation | 8 minutes | −3.0 | −3.5 dB |
| 17 | good | >60 minutes | 0 | −0.1 dB |
| 18 | good | >60 minutes | 0 | −0.1 dB |
| 19 | good | >60 minutes | +0.1 | −0.1 dB |
| 20 | good | >60 minutes | −0.1 | −0.1 dB |
| 21 | good | >60 minutes | +0.2 | −0.2 dB |
| 22 | good | >60 minutes | −2.5 | −0.2 dB |

EXAMPLE 7

The same procedure as in Example 1 was repeated to prepare Sample No. 23 of a ferromagnetic thin film type magnetic recording medium for an 8 mm video tape except that the polyester resin in component A was replaced with a polyester resin in which the ratio of neopentyl glycol/isophthalic acid was varied and the peak temperature of the loss tangent (tanδ) thereof was 18° C.

EXAMPLE 8

The same procedure as in Example 1 was repeated to prepare Sample No. 24 of a ferromagnetic thin film type magnetic recording medium for an 8 mm video tape except that the polyester resin in component A was replaced with a polyester resin in which the ratio of neopentyl glycol/isophthalic acid was varied and the peak temperature of the loss tangent (tanδ) thereof was 85° C.

COMPARATIVE EXAMPLE 3

The same procedure as in Example 1 was repeated to prepare Sample No. C-3 of a ferromagnetic thin film type magnetic recording medium for an 8 mm video tape except that the polyester resin in component A was replaced with a polyester resin in which a ratio of neopentyl glycol/isophthalic acid was varied and the peak temperature of the loss tangent (tanδ) thereof was 4° C.

COMPARATIVE EXAMPLE 4

The same procedure as in Example 1 was repeated to prepare Sample No. C-4 of a ferromagnetic thin film type magnetic recording medium for an 8 mm video tape except that the polyester resin in component A was replaced with a polyester resin in which a ratio of neopentyl glycol/isophthalic acid was varied and the peak temperature of the loss tangent (tanδ) thereof was 10° C.

COMPARATIVE EXAMPLE 5

The same procedure as in Example 1 was repeated to prepare Sample No. C-5 of a ferromagnetic thin film type magnetic recording medium for an 8 mm video tape except that a silica colloid sol having a SiO$_2$ particle size of 3 nm was used as component B.

COMPARATIVE EXAMPLE 6

The same procedure as in Example 1 was repeated to prepare Sample No. C-6 of a ferromagnetic thin film type magnetic recording medium for an 8 mm video tape except that a silica colloid sol having a SiO$_2$ particle size of 300 nm was used as component B.

The results of Sample Nos. 23, 24, and C-3 to C-6 are shown in Table 2.

TABLE 2

| Sample No. | Uniform dispersibility | Still life (minute) | Output at 7 MHz (dB) | Drop in output for 120 min. for 100 passes | Friction coefficient |
|---|---|---|---|---|---|
| 23 | Good | >60 | 0 | −0.3 dB | 0.23 |
| 24 | Good | >60 | 0 | −0.2 dB | 0.23 |
| C-3 | Good | >60 | −2.4 | −1.4 dB | 0.23 |
| C-4 | Good | 45 | −0.2 | −2.6 dB | 0.21 |
| C-5 | Aggregation | 13 | −0.2 | −2.3 dB | 0.30 |
| C-6 | Good | >60 | −3.1 | −0.2 dB | 0.20 |

While the invention has been described in detail and with reference to specific embodiments thereof, it will be apparent to one skilled in the art that various changes and modifications can be made therein without departing from the spirit and scope thereof.

What is claimed is:

1. A ferromagnetic thin film type magnetic recording medium comprising a nonmagnetic intermediate layer having a thickness in the range of from 1 to 100 nm formed between a nonmagnetic support and a magnetic layer, said intermediate layer containing a binder resin having a number average molecular weight of about 10,000 to 100,000 and ultrafine particles at a rate of 1 to 100 particles/$\mu m^2$, wherein said ultrafine particles have a diameter of from 5 to 250 nm and (a) said binder resin has as a polar group at least one group in a concentration of from $1 \times 10^{-2}$ eg/g to $1 \times 10^{-7}$ eg/g selected from the group consisting of $-SO_3M$, $-OH$, $-OSO_3M$, $-COOM$,

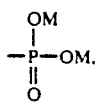

$-NR_2$ and $-\oplus NR_3 X \ominus$ wherein M is H, li, na, K or a hydrocarbon group, R is H or an alkyl group, and X is a halogen atom, or (b) the peak temperature of the loss tangent (tanδ) of said binder resin is from 10 to 90° C.

2. A ferromagnetic recording medium as in claim 1, wherein the peak temperature of the loss tangent (tanδ) of said binder resin is from 10 to 90° C. and said binder resin contains said polar group.

3. A ferromagnetic recording medium as in claim 1, wherein the peak temperature of the loss tangent (tanδ) of said binder resin is from 15 to 85° C.

4. A ferromagnetic recording medium as in claim 1, wherein the peak temperature of the loss tangent (tanδ) of said binder resin is from 18 to 80° C.

5. A ferromagnetic recording medium as in claim 1, wherein the diameter of said ultrafine particles is 10 to 80 nm.

6. A ferromagnetic recording medium as in claim 1, wherein the binder resin has a number average molecular weight of about 30,000 to 80,000.

7. A ferromagnetic recording medium as in claim 1, wherein the concentration of the polar group is $1 \times 10^{-3}$ eg/g to $7 \times 10^{-5}$ eg/g.

8. A ferromagnetic recording medium as in claim 1, wherein said ultrafine particles are contained in the nonmagnetic intermediate layer at a rate of 4 to 30 particles/$\mu m^2$.

9. A ferromagnetic recording medium as in claim 1, wherein the mixing ratio of said ultrafine particles to said binder resin is from 1/3 to 1/80 by weight.

10. A ferromagnetic recording medium as in claim 1, wherein the mixing ratio of said ultrafine particles to said binder resin is from 1/5 to 1/60 by weight.

11. A ferromagnetic recording medium as in claim 1, wherein the thickness of the nonmagnetic intermediate layer is in the range of from 3 to 50 nm.

12. A ferromagnetic recording medium as in claim 1, wherein the nonmagnetic intermediate layer further contains an organic solvent.

* * * * *